United States Patent
Busta

(10) Patent No.: US 6,925,150 B2
(45) Date of Patent: Aug. 2, 2005

(54) METHOD AND APPARATUS FOR PROVIDING A MINIATURE, FLEXIBLE VOLTAGE UPCONVERTER

(75) Inventor: Heinz H. Busta, Park Ridge, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 317 days.

(21) Appl. No.: 10/190,360

(22) Filed: Jul. 3, 2002

(65) Prior Publication Data

US 2004/0005030 A1 Jan. 8, 2004

(51) Int. Cl.[7] .................................. H05G 1/10
(52) U.S. Cl. ........................ 378/101; 378/102
(58) Field of Search .................. 378/101, 102; 250/214.1, 214 R; 257/80–84

(56) References Cited

U.S. PATENT DOCUMENTS

| | | | |
|---|---|---|---|
| 4,241,360 A | 12/1980 | Hambor et al. | 357/56 |
| 5,090,043 A | 2/1992 | Parker et al. | 378/121 |
| 5,282,122 A | 1/1994 | Summer | 363/21 |
| 5,515,259 A | 5/1996 | Stephenson | 363/59 |
| 5,729,583 A | 3/1998 | Tang et al. | 378/122 |
| 5,757,146 A | 5/1998 | Carder | 315/505 |
| 5,814,135 A | 9/1998 | Weinberg | 96/58 |
| 5,854,822 A | 12/1998 | Chornenky et al. | 378/122 |
| 6,095,966 A | 8/2000 | Chornenky et al. | 600/3 |
| 6,108,402 A | 8/2000 | Chornenky | 378/119 |
| 6,658,086 B2 * | 12/2003 | Dinsmore | 378/65 |

\* cited by examiner

Primary Examiner—Edward J. Glick
Assistant Examiner—Jurie Yun
(74) Attorney, Agent, or Firm—Thomas Wettermann

(57) ABSTRACT

A method and apparatus for providing a miniaturized, flexible high voltage up-converter. Aspects of the invention are particularly useful in providing an apparatus comprising a plurality of up-converting modules while also allowing the apparatus to maintain a desired degree of flexibility. However, certain aspects of the invention may be equally applicable in other scenarios as well.

26 Claims, 9 Drawing Sheets

METHOD AND APPARATUS FOR PROVIDING A MINIATURE, FLEXIBLE VOLTAGE UPCONVERTER

BACKGROUND

I. Field of the Invention

The present invention is generally directed to a method and apparatus for voltage upconverting. More particularly, the present invention is directed to a method and apparatus for providing a miniaturized, flexible high voltage up-converter. Aspects of the invention are particularly useful in providing an apparatus comprising a plurality of up-converting modules while also allowing the apparatus to maintain a desired degree of flexibility. However, certain aspects of the invention may be equally applicable in other scenarios as well.

II. Description of Related Technology

In conventional angioplasty operations, a stent is inserted into a patient's artery that may be occluded or constricted by plaque. These stents allow a surgeon to, via in-vivo stent manipulation and guidance, enter the patient's body and keep the occlusion unrestricted. If, subsequently, the stent occluded again, irradiation of the constricted stent area may be required. Alternatively, catheters may be used to irradiate a cancerous growth. Irradiation occurs with radioactive seeds emitting beta or gamma rays. To produce these beta or gamma rays, however, the catheters have to be provided with means allowing those radioactive seeds to travel to the site where treatment is needed. These seeds are highly radioactive and irradiate the entire length of the artery from insertion point to the treatment site. Once removed from the shielding container, they pose a health risk to the patient and the medical professionals administering treatment. To solve some of these problems associated with the radioactive seeds, it is desirable to provide an X-ray generating device that generates an X-ray source near the desired area and the X-ray dose can be generated in-vivo at will. Because the radiation must be produced at the site of interest (i.e., at the obstructed artery or the cancerous growth), this X-ray tube is typically located at a distal end of the stent or catheter.

Under ordinary operation, these X-ray tubes require a high degree of power (voltage) to operate. For example, U.S. Pat. No. 5,090,043 entitled "X-ray Micro-Tube and Method of Use in Radiation Oncology" to Parker et al. teaches the use of an apparatus and method for the treatment of a patient having a tumor.

Parker et al. teaches using an X-ray generating source positioned at a location in close proximity to site or application (e.g., an artery, a vein, or a tumor). The X-ray generating source is operable at a voltage level in the range of approximately 10–60 kilo-electron volts (keV) to thereby enhance absorption of the generated X-rays by the tumor and minimizing the side effects of radiation therapy on the patient normal tissue.

Therefore, to provide the necessary voltage and power to certain types of miniature X-ray tubes, approximately 10–60 keV are required. For treatment of occluded stents, approximately 20 kV are sufficient. To provide this high level of voltage at a distal end of a catheter, the power must be provided along the entire catheter cable to the catheter distal end. Proposed catheters, however, are provided with a lengthy high voltage power cable. For example, a proposed catheter high voltage cable is typically on the order of three feet in length. Therefore, a dangerous situation arises where the peak voltage of 20 kV must traverse along the entire length of the catheter cable and then along the length of the catheter to eventually reach the X-ray unit.

Providing this peak voltage along a high voltage cable feeding the catheter and then also running the entire length of the catheter poses certain dangerous operating conditions. For example, storing such a large amount of energy can accidentally and/or inadvertently discharge and harm or fatally injure a patient and/or physician. Flashover between the high voltage components and an exterior housing of the catheter (an electrical ground) could harm or even kill the patient, the administering physician, and/or others involved in the in-vivo operation (e.g., members of the operating staff). Flashover occurs where there is leakage between the outside grounded and the inside high-voltage and this leakage if followed by a dielectric breakdown. This flashover concern exists along the entire cable length.

Therefore, because of a requirement for a long high voltage cable, most proposed miniature X-ray tube catheter systems behave as essentially a very large, charged capacitor.

There is, therefore, a general need to be able to reduce the necessity of a lengthy high voltage cable. There is also a general need to reduce a high voltage system's overall capacitance, and therefore potential flashover. These general needs should also be met while also being able to generate a high enough voltage for X-ray application at the point of observation or X-ray application.

Aside from these high voltage breakdown and capacitance concerns, there is also a maneuvering or manipulating concern associated with catheters containing miniaturized X-ray tubes. For example, because such medical devices may be used in a variety of applications (e.g., angioplasty, tumor irradiation, etc.), the catheter containing certain components must be flexible enough so that during an in-vivo operation, a user of the device (i.e., a surgeon) can maneuver and/or manipulate the subject catheter so as to manipulate or guide the X-ray unit along an artery to accurately position the catheter at a desired location. Because certain proposed miniature X-ray tubes have been large (larger than 2.5 mm in diameter), there is a further need for a flexible, guidable device comprising a X-ray tube device having a diameter less than 2.5 mm. It is believed that an ideal X-ray tube for angioplasty procedures has a diameter ranging from 0.5 to 1.0 mm. Other diameter sizes could also be desired depending on the application of the X-ray tube.

Even though the same proposed concepts may describe a relatively compact voltage source, the dimensions of such voltage sources are large, often on the scale of inches. For example, the voltage source disclosed in U.S. Pat. No. 4,241,360 discloses a voltage source having a size on the order of 0.5 inches in length (12 mm) and 0.2 inches wide (5 mm). For medical applications, and especially for catheters that are inserted inside a body, further miniaturization is desired. In addition, where a voltage source is used in a catheter or other in-vivo applications, the catheter and hence the voltage source must have some degree of flexibility and maneuverability.

There is also a need to provide a miniaturized power source that reduces the risk to the patient by minimizing the discharge power and while also maintaining catheter flexibility. There is also a general need to provide a power source that can be guidable through difficult passageways and provide a source of power at difficult to reach areas.

SUMMARY

According to one exemplary arrangement, an apparatus for up-converting an initial voltage includes a first photodiode module. A first photon source is optically coupled to the first photodiode module to a light source. The first module up-converts the initial voltage to a first up-converted voltage. A second photodiode module receives the first up-converted voltage from the first photodiode module and a photon source coupled to the second photodiode module to the source. The second photodiode module up-converts the first up-converted voltage to a second up-converted voltage.

According to another exemplary arrangement, a method of voltage up-converting includes the steps of electrically coupling a first up-converting module to a second module and optically coupling a photon source to the first and the second modules. The photon source generates at the first up-converting module an up-converted voltage. This upconverted voltage is provided to the second up-converting module from the first up-converting module and the source is utilized to up-convert the first voltage.

In another arrangement, a miniaturized, flexible voltage up-converting instrument includes an X-ray generating source insertable into a body of a patient to a location in close proximity to a desired point of X-ray application. A first modular voltage up-converter is coupled to the generating source. An up-converted voltage is applied to the source to generate a desired X-ray dose at a desired point of application.

In yet an alternative arrangement, a method of fabricating a voltage up-converter is provided. The method includes the steps of:
providing a substrate containing a thin layer of silicon conducting material;
performing an initial n⁻ type of ion implantation region, said region defining an initial photodiode pattern on a surface of said substrate;
fabricating a plurality of p⁺ type ion implantation regions along said photodiode pattern;
fabricating a second plurality of n⁺ ion implantation regions along said photodiode pattern; and
providing an oxide layer along a top surface of said photodiode pattern.

In yet another arrangement, a miniaturized, flexible voltage up-converting instrument includes an X-ray generating source insertable into a body of a patient to a location in close proximity to a desired point of X-ray application. A first modular voltage up-converter is coupled to the X-ray generating source so that an up-converted voltage is applied to the X-ray source to generate a desired amount of X-ray dose at the desired point of X-ray application.

These as well as other advantages of various aspects of applicant's present arrangements will become apparent to those of ordinary skill in the art by reading the following detailed description, with appropriate reference to the accompanying drawings.

BRIEF DESCRIPTION OF THE DRAWINGS

An exemplary arrangement described herein with reference to the drawings, in which.

DETAILED DESCRIPTION

1. Overview

As previously described, X-ray generating devices require a large potential voltage. For example, a proposed X-ray device, such as the X-ray device illustrated in FIG. 1, generally requires an applied voltage on the order of between 15 kV to 30 kV. Providing such a large potential voltage presents certain safety concerns, especially where the X-ray generator is provided in a miniaturized instrument, such as a catheter. For example, one such typical X-ray device system is illustrated in FIG. 1.

Figure 1:
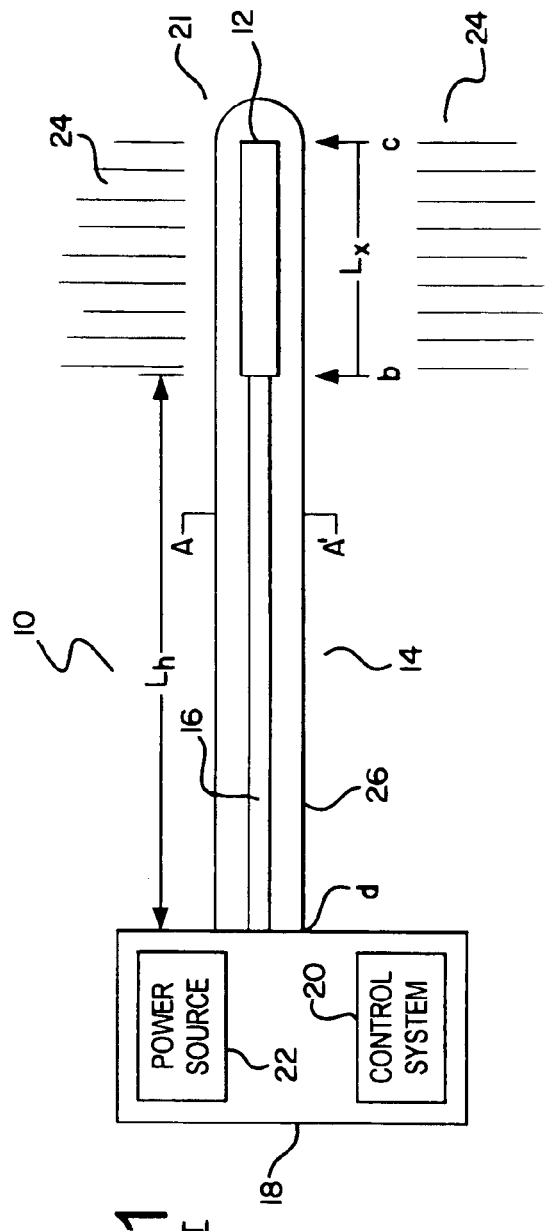
FIG. 1 illustrates a known miniature X-ray apparatus system.

FIG. 1 illustrates a schematic view of a proposed arrangement of a high voltage X-ray system 10. The X-ray system 10 includes an instrumentation system 18 and an X-ray enclosure 14. The enclosure 14 contains an X-ray emitting apparatus 12. Apparatus 12 includes an X-ray emitting source and a high voltage wire 16. The X-ray emitting source is located at a distal end of the enclosure. The X-ray emitting source 12 must be electrically coupled to the high voltage source 22, such as by way of a high voltage wire 16.

As seen from FIG. 1, the X-ray source 12 includes an X-ray emitting head 21 and a power wire 16 to which the head 21 is connected. The instrumentation system 18 is also provided and includes a control unit 20 and a high voltage power source 22. The control unit 20, preferably an operator controlled unit, operates the X-ray unit and determines, via an operator control device, when the X-ray apparatus begins irradiation. The operator control device (not shown) could be a foot switch or other human interface, such as a button, switch, or other like device.

As illustrated in FIG. 1, the X-ray apparatus is directly coupled to the high voltage wire 16. The high voltage cable runs the length of the X-ray system housing 14, $L_h$. At one end d of the X-ray system housing 14, the high voltage wire terminates at the instrumentation system 18 where the high voltage wire is electrically coupled to the high voltage power source 22.

Typically, the X-ray head 21 will include a vacuum chamber. The vacuum chamber houses a microscopic cathode for generating electrons. An anode will also be provided. The anode accelerates and attracts the electrons and emits X-ray radiation 24 upon bombardment by the accelerated electrons. The emitted X-ray radiation is then used to irradiate a constricted artery, a cancerous growth (tumor), or other unwanted substance. For more information relating to such a typical X-ray head, the reader is directed to Tang U.S. Pat. No. 5,729,583; Parker U.S. Pat. No. 5,090,043; Smith U.S. Pat. No. 5,984,853; and Smith U.S. Pat. No. 6,241,651, herein entirely incorporated by reference and to which the reader is directed for further details.

As illustrated, the X-ray emitter 12 resides within an enclosure 14. Such an enclosure could include a manually manipulated medical device used for in-vivo applications. For example, the housing illustrated in FIG. 1 could be a catheter used in an angioplasty operation. Alternatively, the miniaturized X-ray source could be used or placed within the confines of a structure that requires a high potential including dental applications, desk top crystallography, protein examinations, and the like.

One limitation as to the manipulation of the arrangement of FIG. 1 relates to the actual size of the X-ray unit 12 ($L_x$) and its diameter and the high voltage wire provided along the length $L_h$ of the body. Where the X-ray unit 12 has a length of $L_x$, the catheter head 21 would not be able to be flexed along this portion of the enclosure. Rather, the housing could only be flexed in between the points of b and d and could not be flexed between the points of c and b. The actual size of the catheter head 21 therefore, restrains the manipulation of the enclosure.

Another limitation of the arrangement illustrated in FIG. 1 stems from the fact that the high voltage wire 16 carries the high voltage the entire distance $L_h$ from the power source to the X-ray unit 12. Therefore, there is a potential risk that there will be a breakdown between the internal wire and the catheter outer enclosure 26 (i.e., ground). This is particularly problematic given that a potential breakdown could occur anywhere along the entire length of the catheter since a voltage of significant magnitude is present along the entire length of the cable. This is particularly problematic given that the enclosure may be used as an in-vivo medical instrument.

The X-ray apparatus 14 comprises both a distal end and a proximal end. Where the high voltage power source is utilized to generate X-rays, the high voltage power source will ordinarily be located in the proximal end of the medical device. Once the X-ray unit is energized with a desired amount of power, X-rays 24 are emitted from the distal end. Preferably, these X-rays 24 are emitted in a rotational symmetric fashion.

Figure 2:
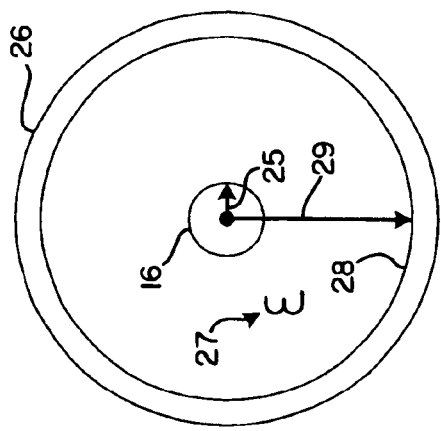
FIG. 2 is a cross sectional view of the high-voltage cable of a miniature X-ray apparatus system illustrated in FIG. 1.

FIG. 2 illustrates a cross sectional view of the device housing illustrated in FIG. 1 along the A-A' view. Referring now to FIGS. 1 and 2, typically, the enclosure housing 26 of the system 10 has a diameter d ranging from about 1.4 to about 2 millimeters (mm). Diameter d may be measured from the center of the high voltage wire 16 to the outer wall 28 of enclosure 26. A proposed X-ray device, such as the X-ray device 12 illustrated in FIG. 1, may have a diameter of approximately 1-2 mm and may have a length $L_x$ of approximately 2-4 mm long. The catheter extends from the proximal end to the distal end wherein this length $L_h$ could be as long as 3 feet. Supplying a high voltage (20 kV) along a 3 foot cable having a diameter of about 2 mm presents a dangerous situation since the energy stored along the catheter is large and therefore, the catheter in essence acts like a large, charged capacitor.

This may be seen by equating the energy stored in such a system. For example, the stored energy of the system may be calculated using the following equation: $U=\frac{1}{2}C*V^2$, where U is the stored potential energy, C is the capacitance, and V the voltage. For a catheter having a diameter of approximately 1.4 mm and the high voltage wire having a radius $r_1$ ranging from 40 to approximately 220 micrometers ($\mu$m), the overall capacitance of the device will generally range from $3.9\times10^{-11}$ to $9.6\times10^{-11}$ Farads for a 3 foot cable and catheter system. If the X-ray source 12 required about 20 kV of power, the total energy stored along the device would approach 0.01 Watt-seconds. If this energy were to inadvertently discharge during a short time period, for example during 1 micro-second ($\mu$sec) time interval, the dissipated power (P=U/T) would be at a dangerous level: $P=10^4$ Watts. Therefore, by providing a point of use power supply (providing a desired amount of power at only one specific point), which is in close proximity to the X-ray head, the overall system capacitance may be significantly reduced and therefore the capacitive discharge potential.

Figure 3:
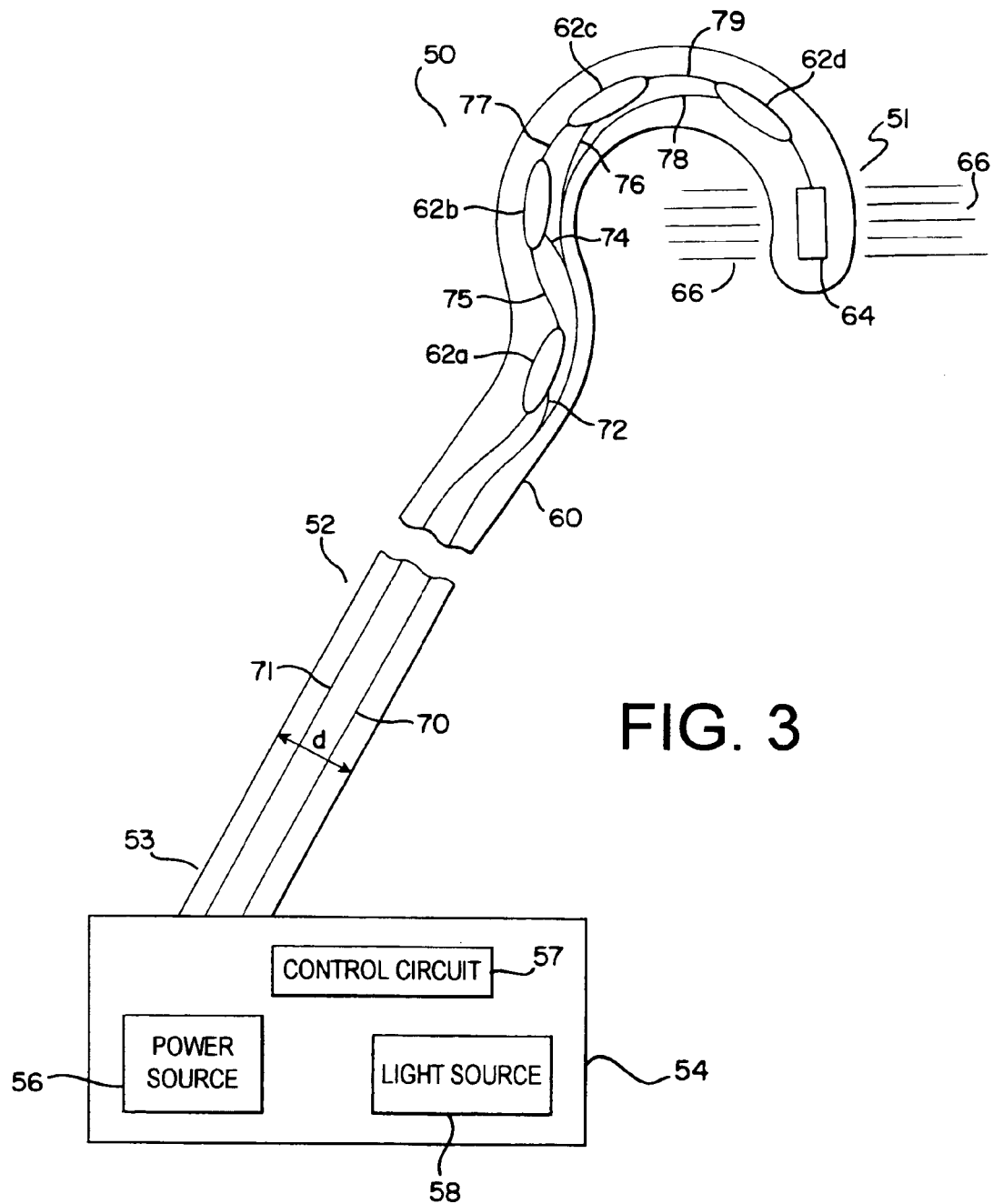
FIG. 3 illustrates a schematic representation of a preferred arrangement of a miniature, flexible voltage up-converter system comprising a plurality of voltage up-converter modules.

FIG. 3 illustrates one preferred arrangement of a voltage up-converter system 50. The system 50 includes a voltage up-converting point of use device 52 coupled to an instrumentation control 54. The instrumentation control 54 includes a power source 56, a light source 58, and a control circuit 57.

The up-converting point of use device 52 extends from a distal end 51 to a proximal end 53 and includes a plurality of voltage up-converter modules 62(a–d). An X-ray emitter 64 is provided at the distal end. As illustrated in FIG. 3, the up-converting point of use device includes four up-converter modules are shown. However, it will be appreciated by those of ordinary skill in the art that other up-converter modules may also be utilized. For example, a point of use device could have more or less than four modules depending on the overall design and performance requirements sought.

As will be described in further detail below, each voltage up-converter module 62(a–d) comprises a plurality of photodiodes. As can be seen from the arrangement illustrated in FIG. 3, the modules 62(a–d) are coupled in a cascaded series, one after the other. Alternatively, a miniaturized up-converting module could comprise, rather than photodiodes, certain conventional, relatively compact voltage sources. For example, a voltage source such as the voltage sources disclosed in U.S. Pat. Nos. 5,282,122 and 4,241,360, herein entirely incorporated by reference and to which the reader is directed for further details, may be used in certain circumstances where a miniaturized, flexible, device is desired.

Each up-converter module provides an incremental voltage up-conversion from an initial input voltage. Such an initial input voltage may be provided from the power source 56 or as an up-converted voltage from another up-converter module. A final up-converted voltage is then available at the X-ray emitter 64. For example, the first voltage up-converter module 62(a) receives a first input voltage and up-converts this first input voltage to a first output voltage. This first input voltage may be received by the power source 56 of the instrumentation control 54. Alternatively, because of the current and voltage characteristics of the solid state components making up the up-converter module 62(a), an initial input voltage may not be required. In such a scenario, a photon source 72 is provided by the light source 58 along the fiber optic cable 70. In this manner, the photons provided by the first fiber optic cable 72 are used to optically generate an output voltage so as to provide an input to the second up-converting module 62b.

The first output voltage (and now a second input voltage) is then applied to the second voltage up-converter module 62(b). This second up-converter module 62(b) up-converts this input voltage to a second output voltage (i.e., a third input voltage). Voltage up-converter 62(b) then provides an up-converted output voltage to a third voltage up-converter module 62(c). As with the first and the second voltage up-converters 62(a–b), the third voltage up-converter module 62(c) up-converters this input voltage and provides an output voltage to the fourth and final power supply module 62(d). In this up-converting manner, the modules may be fabricated so as to produce a known and desired, final up-converted voltage to the X-ray device 64. This up-converted voltage is then used by the X-ray device 64 to generate the X-rays 66.

An anode of the X-ray emitter receives this voltage from the fourth voltage up-converter and, under the control of the operator control system 57, emits an X-ray pattern 66 as previously described above.

Preferably, both the X-ray source 64 and the up-converting modules are contained within a single enclosure, such as a medical instrument (a catheter). In the arrangement illustrated in FIG. 3, four up-converting modules are provided. However, as those of ordinary skill will recognize, other up-converting module arrangements may also be provided. Those of ordinary skill will also recognize, as will be described, various aspects of up-converting module fabrication will tend to effect a number of modules required to eventually produce the necessary and desired final voltage to be provided to the X-ray device 64. Varying an initial input voltage will also affect the final up-converted output voltage.

The up-converting device may be designed to produce a wide array of different voltages. For example, in one arrangement, the first modular section 62(a) has an input potential supplied along input line 71 of approximately 0 to 1000 volts and up-converts this input voltage to approximately 4 kV. This initial input potential could be provided by the power source 56. Other input potentials could also be provided. For example, in one arrangement, the input potential may be 0 volts. In such an arrangement, the first modular section relies on a light source (photon source via fiber optic cable) to provide an initial voltage up-conversion.

In one arrangement, the voltage up-converter modules 62(a–d) are all essentially identical modules. That is, each up-converter module has been fabricated so as to produce essentially the same up-converting characteristics (each module up-converts an input voltage by the same amount: 4–5 kV). Alternative arrangements may also be provided wherein the modules comprise different up-converting characteristics (up-converting rates) to thereby produce different up-converting voltages. For example, a first up-converting module could up-convert an input of 0.1 kV to 3 kV (an up-converting rate of approximately 3 kV) and a second up-converting module could up-convert 3 kV to 9 kV (an up-converting rate of approximately 6 kV). As those of ordinary skill in the art will recognize, other upconverting rates may also be provided.

Returning to FIG. 3, the second modular section 62b receives the output of the up-converting module 62(a) along voltage line 75 and up-converts this input voltage (4–5 kV) to a second voltage that may be provided at voltage line 77. In one arrangement, this second voltage is 10 kV. This up-converting process is repeated through the remaining modular sections. In this manner, the fourth modular section 62(d) up-converts an input voltage provided along voltage line 79 to an output voltage of 20 kV. For certain angioplasty operations, this is a sufficient voltage.

One advantage of the device illustrated in FIG. 3 is that there is generally only one general location in the entire system where a peak voltage of 20 kV is provided. This point is located at the output of the fourth up-converter modular section 62(d). It is only at the fourth modular section output (at the X-ray unit 64), therefore, that the greatest probability of a dielectric breakdown can occur. However, unlike in certain proposed miniaturized high voltage configurations, this peak voltage is not present, nor is it required, along the entire length of the voltage source enclosure. Rather, any peak voltage is provided at only one point: the input of the X-ray unit. Consequently, the overall structural charge-up capacitance of the entire structure is reduced and may be reduced to approximately the size of the last modular section (i.e., the size of modular section 62(d)).

In one arrangement, the size of the last modular section, and therefore the relevant capacitance, is roughly on the order of about 1 millimeter. In one arrangement, the overall capacitance may be reduced by a factor of 1000 over the proposed system illustrated in FIG. 1 by reducing the length from 3 feet (~1000 mm) to 1 mm, which is the X-ray head. Therefore, in the advent of an inadvertent discharge, only 10 Watts would be discharged as compared to 10,000 Watts as mentioned above.

The voltage up-converter arrangement illustrated in FIG. 3 provides a number of advantages. One advantage is that peak voltages are only present at the desired point of X-ray application. That is, the peak voltage is available only near at the X-ray unit. Therefore, the peak voltage need not propagate along the entire length of the catheter. Therefore, the point of highest voltage has the largest probability of dielectric breakdown. Here, because the size of the last modular section is miniaturized, the system's overall capacitance is also quite small since the length of the capacitance (i.e., the length of the last modular component) is only on the order of 1 mm. Consequently, the overall system concern for flashback is substantially reduced.

Another advantage of the arrangement illustrated in FIG. 3 is its flexible characteristics. As previously discussed, there is a need for a flexible and maneuverable device that allows an up-converted voltage to be applied at certain small locations. Because of the multi-sectioned structure of the arrangement illustrated in FIG. 3, the device 50 can be manipulated in various configurations.

Figure 4:
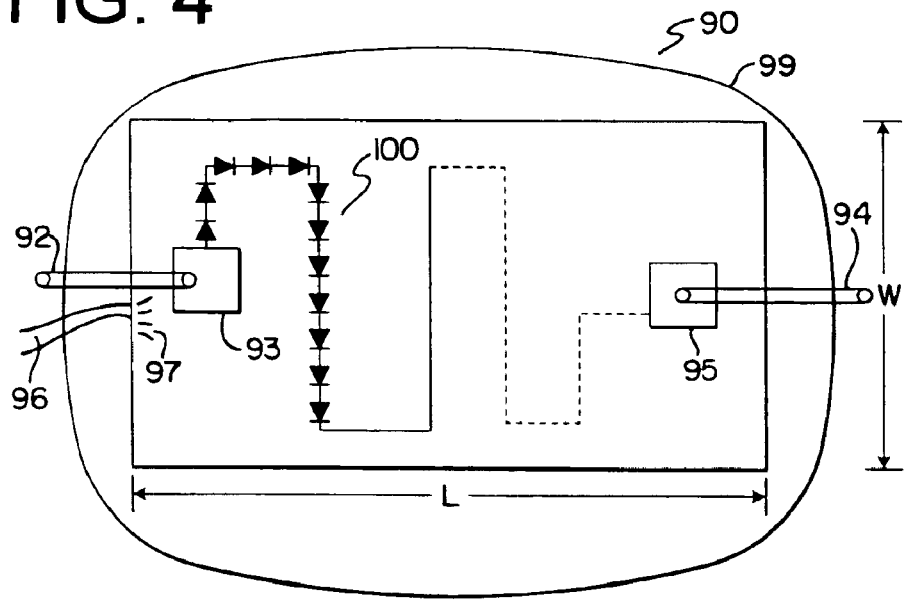
FIG. 4 illustrates a schematic representation of one of the plurality of voltage up-converter modules provided in the up-converter system illustrated in FIG. 3.

Several methods may be implemented to fabricate one of the modular sections provided in the system illustrated in FIG. 3. For example, FIG. 4 illustrates an arrangement 90 of one of the up-converting modular sections illustrated in FIG. 3. In this arrangement, the modular section comprises a solid-state device containing a large number (several thousand) laterally fabricated photodiodes. A schematic representation of such a potential photo diode arrangement 90 is illustrated in FIG. 4. In this schematic representation, the photo diode arrangement 90 has a width of W and a length of L. In one arrangement, this width W is about 1.0 mm and this length L is about 1.3 mm. Such dimensions make this photo diode module an ideal candidate for applications requiring a miniaturized "point of use" power source.

As shown in FIG. 4, the arrangement 90 includes a serial array of diodes provided along a substrate surface. Preferably, this substrate comprises a sapphire supporting structure.

The photodiodes making up the modular section 90 are fabricated in a cascaded, serial fashion. Preferably, and as will be discussed in greater detail below, the photodiodes are laterally disposed in a pattern along a substrate surface and configured in a generally meandering type of configuration as shown in FIG. 4. The photodiodes begin at a first termination point 93, wind along the meandering photodiode pattern, and eventually end at a second termination point 95.

The modular section 90 is provided with an input voltage at a modular section voltage input line 92, up-converts this input voltage, and then provides a modular section voltage output at line 94. The modular section input, normally a wire, can receive an initial potential voltage (e.g., 0–1000 volts).

Line 94 provides an output voltage. Where the input wire supplies an input voltage, the modular section up-converts the initial potential voltage to a second potential voltage which can then be supplied as an input to another modular section. Alternatively, where the modular structure 90 is the last modular section in a cascaded plurality of sections (such as the forth modular section 62(d) illustrated in FIG. 3), section 90 provides an up-converted peak voltage to a device, such as the X-ray unit 64 illustrated in FIG. 3.

The modular section 90 is optically coupled to a light source via an optical fiber 96. Fiber 96 provides a source of light (photons) so as to energize the plurality of photo diodes 100. For example, in one arrangement, the modular section 90 receives a source of photons 97 over optical fiber 96, wherein, the optical fiber 96 is optically coupled to a light source, such as the light source 58 illustrated in FIG. 3. In one arrangement, the optical fiber 96 has a diameter of 120 $\mu$m (0.12 mm). In one arrangement, the fiber optic cable 96 is bundled with a plurality of other optical fibers. These various optical fibers act as a separate photon source to each modular section.

The modular section can be fabricated to have a length designated L and a width designated W such that the modular section is small enough to be contained in a miniature instrument, such as the instrument illustrated in FIG. 3. More preferably, in one arrangement, the designated length L is 1.3 mm and the designated width W is 1 mm. However, as those of ordinary skill in the art will recognize, other structures, configurations, and/or dimensions may also be utilized.

The modular structure 90 may be encapsulated within an encapsulation media 99. Encapsulation media 99 is shown in FIG. 4 as surrounding or "encapsulating" the modular device substrate. Wires 92, 94 and the fiber optic cable 96 protrude outside the encapsulated area. In such an arrangement, the encapsulation media 99 provides a degree of optical and electrical isolation between the optical sensitivities of the plurality of photodiodes 100 and an environment surrounding the encapsulated media. The media could comprise certain plastics, pyrelene, Teflon, polyimide, certain forms of polydimethylsiloxane (PDMS), or other types. The encapsulation medium 99 also provides a degree of stability (or support) for the wire 92, the outgoing wire 94, and the fiber optic cable 96.

Utilizing the arrangement illustrated in FIG. 4, a large number of photo-diodes may be fabricated onto a small substrate footprint. Generally, the greater the number of photodiodes per module, the greater the module's up-converting rate. This can be illustrated by equating the number of diodes that may be fabricated onto a 1×1.3 mm$^2$ chip, such as the modular section illustrated in FIG. 4. The unit cell (area per diode) is 15×10 $\mu$m$^2$ so this equals 150 $\mu$m$^2$. The total area of the up-converter module is 1×1.3 mm=1000×1300=1.3×10$^6$ $\mu$m$^2$. If N is defined as the number of diodes per module, one can see that N=(1.3×10$^6$)/150 which equals approximately 8,700 diodes. Therefore, if each photodiode generates a photo voltage of approximately 0.5 volts, a module comprising 8,700 photo-diodes can generate 4350 volts (4.35 kV). Modular sections having other up-converting rates may also be fabricated in a similar manner. In addition to silicon as described below, other photo materials may also be used, including Gallium Arsenide.

The photodiodes provided in the modular section 90 may be fabricated utilizing various methods. One such method involves the fabricating process 112 illustrated in FIG. 5. Process 112 is particularly useful in fabricating an array of laterally disposed photo-diodes. Process 112 will be described in reference to FIG. 5 and the various steps illustrated in FIGS. 6(a–i).

Figure 6A:
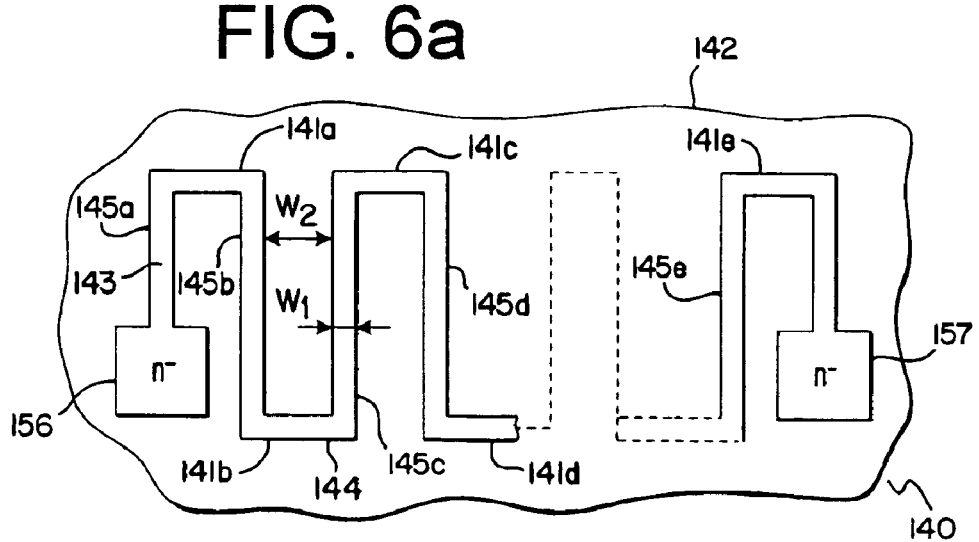
FIG. 6(a) illustrates a first processing step for fabricating a lateral type photodiode pattern that can be used for the voltage up-converter module illustrated in FIG. 4.

First, at step 114 and as illustrated in FIG. 6(a), a silicon-on-insulator substrate 142 may be quartz (SiO$_2$) or alternatively, sapphire (Al$_2$O$_3$), is first provided. This substrate contains commercially available polycrystalline silicon, laser crystallized polycrystalline silicon, or single crystal silicon. This is referred to as Silicon-On-Insulator (S-O-I).

Ion implantation (phosphorus or arsenic) is performed to render the undoped silicon of the SOI wafer slightly n$^-$ type at a desired concentration, preferably at a concentration of approximately 1×10$^{15}$ atoms/cm$^3$ to 8×10$^{15}$ atoms/cm$^3$.

Next, referring now to FIG. 6(a), a photo-diode pattern 144 is formed by depositing a positive photoresist on substrate 142. This photo-diode patterning occurs at step 118 in FIG. 5.

Next, a photoresist is provided. Such a positive photoresist may be Shipley 1818 that is deposited onto the substrate 142 by spin coating. Other coating methods could also be used. After baking at about 100° C. for several minutes, the photoresist is then exposed via a mask using an ultraviolet light source. The photodiode pattern 144 is developed and the silicon is etched using a plasma etcher containing a CF$_4$/O$_2$ mixture. Other etching gases can be used as well as chemical etchants.

The pattern 144 is preferably of a meander-type pattern. As will be explained in further detail below, such a meandering photo-diode type pattern results in an array structure that provides a high density of serially connected laterally constructed diodes (photo-diodes/mm$^2$). Those of skill in the art, however, will note that other type of photo-diode pattern could also be used. For example, certain patterns could be chosen that maximize the distance between the input voltage and the up-converted voltage.

As can be seen from FIG. 6(a), the meander-type pattern 144 comprises a number of columns 145(a–e) and a number of rows 141(a–e). These various columns 145(a–e) are attached via a number of rows 141(a–e). For example, column 145(c) is connected to column 145(d) via row 141(c). In one arrangement, each column has a width w$_1$ of approximately 5 $\mu$m and each row connecting adjacent columns has a width w$_2$ of approximately 5 $\mu$m.

The meandering type pattern 144 begins at a first terminal point 156 and extends across a surface 142 of the substrate 140 to a second terminal point 157. The first terminal point 156 has a larger width than the rows and will preferably provide a contact point for an electrical connection, such as for the wire 92 illustrated in FIG. 4. Similarly, the second terminal point 157 has a width large enough so as to provide a contact point for another electrical connection, such as for the wire 94 illustrated in FIG. 4.

As a next step in the fabrication process, a p+ type implant takes place. (step 120, FIG. 5). FIG. 6(b) illustrates p+ type implantation along a portion of the photo-diode pattern 144 illustrated in FIG. 6(a). Prior to this procedure, the photoresist on top of the n− silicon 144 of FIG. 6(a) has been removed via a wet or a dry stripping step.

A photo-resist step is now repeated to fabricate a multitude of p+ regions along the meandering pattern 144. Boron could be used to fabricate these p+ regions. A photo resist is then spun on, baked, exposed, and developed and boron is ion implanted to a concentration of about $1\times10^{18}$ ions/cm$^3$ to about $5\times10^{18}$ ions/cm$^3$ in the regions where the photoresist has been developed (see FIG. 6b).

FIG. 6(b) illustrates a fabricated region portion 150 of the n− implanted meander 144. As illustrated in FIG. 6(b), the fabricated portion 150 comprises a first p+ implant zone 156 and a second p+ implant zone 158. Adjacent this first p+ implant region 156 is a first photoresist 154 protecting an underlying n− implanted region during p+ implant. The second p+ implant region 158 is provided adjacent the first and the second photo resists 154, 152, respectively. The remainder of the entire photo-diode pattern 144 of FIG. 6(a) extending from the first termination point 156 to the second termination point 157 is fabricated in a similar manner.

Prior to the next implantation step, the photoresist regions are removed. (step 122 in FIG. 5) and an n+ implantation process occurs at step 126 of FIG. 5. This n+ implantation step 126 is illustrated in FIG. 6(c). As shown, fabricated substrate portion 160 includes a first, a second, and a third photoresist area 162, 164, and 166, respectively. These photoresist areas act to protect the underlying previously implanted regions. The n+ implants are represented by areas 170 and 168. In one arrangement, the n+ implant comprises either phosphorous or arsenic and is implanted to a concentration of approximately $1\times10^{18}$ to $5\times10^{18}$ ions/cm$^3$.

Figure 6B:
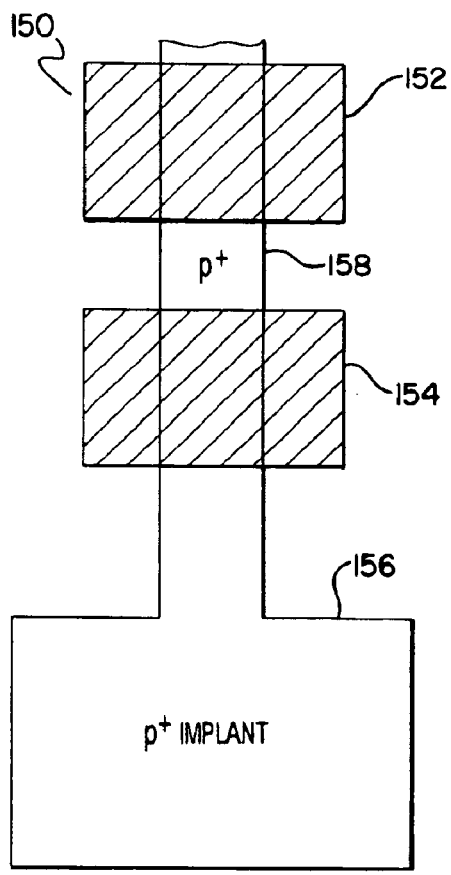
FIG. 6(b) illustrates another processing step for fabricating the voltage up-converter illustrated in FIG. 4.
Figure 6C:
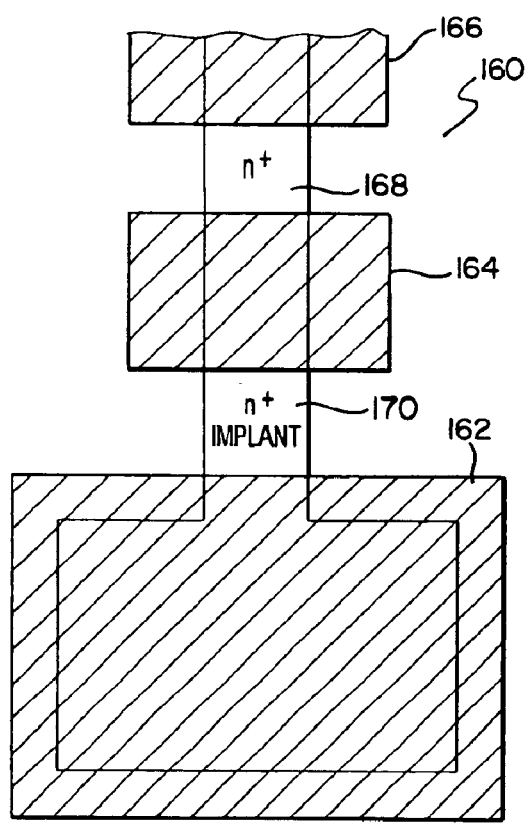
FIG. 6(c) illustrates another processing step for fabricating the voltage up-converter illustrated in FIG. 4.
Figure 6D:
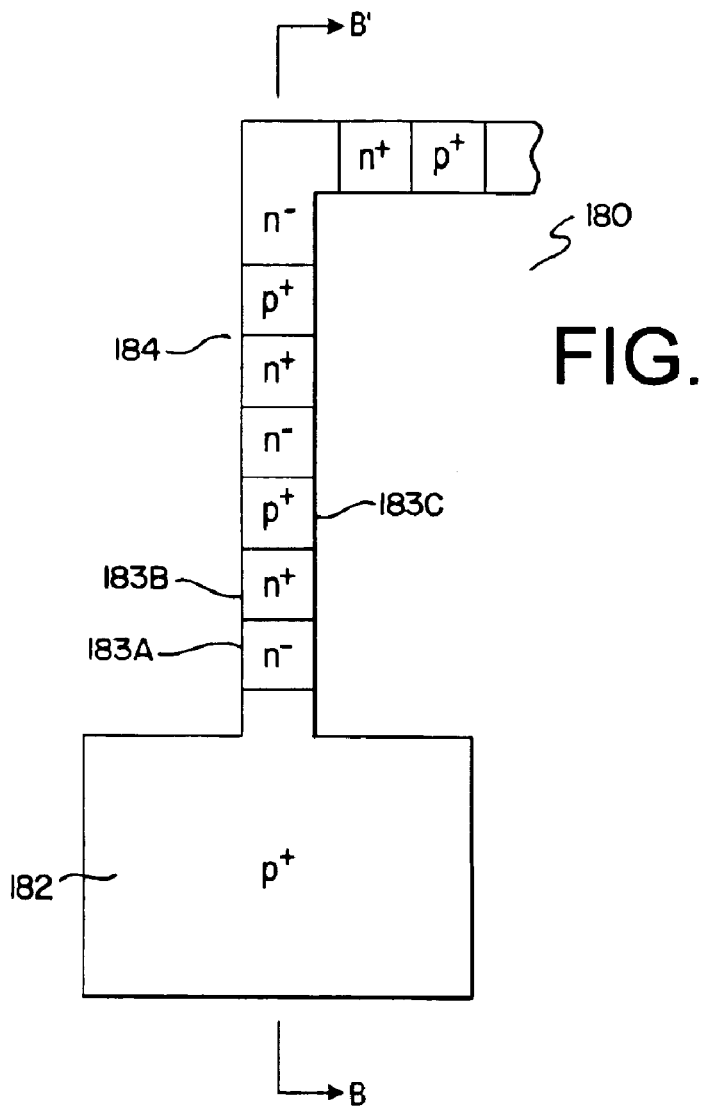
FIG. 6(d) illustrates another processing step for fabricating the voltage up-converter illustrated in FIG. 4.

In a next step, the photoresist regions 162, 164, and 166 are removed. Removing the photoresists 162, 164, and 166 results in a top view of a portion of a fabricated device 180 is illustrated in FIG. 6(d). As shown in FIG. 6(d), the fabricated device 180 now comprises a p+ region defining a first termination point 182. Adjacent this p+ region termination point 182 is an n− type region 183A, an n+ type region 183B, and then another p+ type region 183C. This p+ to n− to n+ pattern is repeated throughout the photodiode pattern, extending from the first termination point 156 to the second termination point 157 of FIG. 6(a).

At step 128 (FIG. 5), the silicon and substrate are cleaned. After the cleaning step 128, a protective oxide layer, preferably SiO$_2$, is grown over the various doped silicon regions. This occurs at step 130. In one arrangement, an oxide layer of about 1000 Angstroms is grown at about 950–1000 degrees Celsius. During the oxide layer growing process, the ion implanted regions are being activated, i.e., the ion implanted regions are rendered electrically conductive.

Figure 6E:
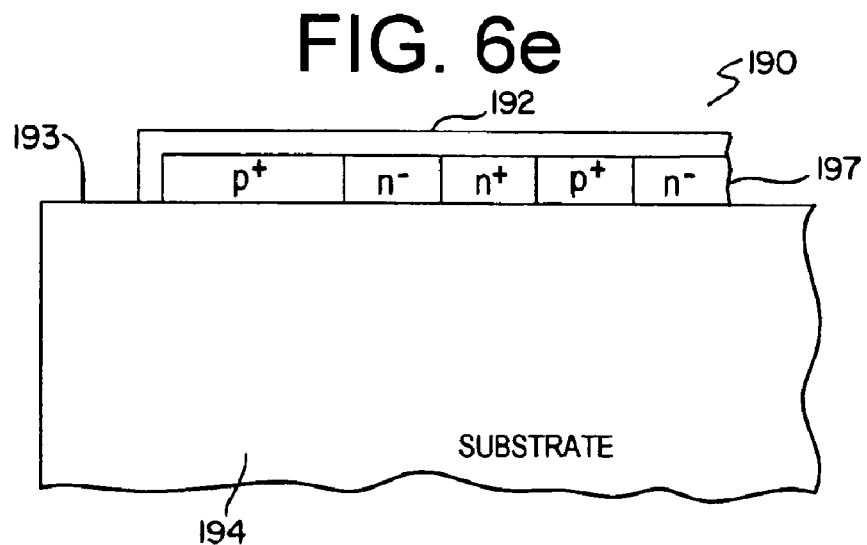
FIG. 6(e) illustrates another processing step for fabricating the voltage up-converter illustrated in FIG. 4.

FIG. 6(e) illustrates a cut away view along view B—B' of the substrate portion 180 illustrated in FIG. 6(d). This cut-away view illustrates the substrate 194 after an oxide layer 192 has been grown over the surface 193 of the device 190. As shown, the lateral array of the various doped regions comprising the photodiodes 197 are disposed along the top surface 193 of the substrate layer 194.

Figure 6F:
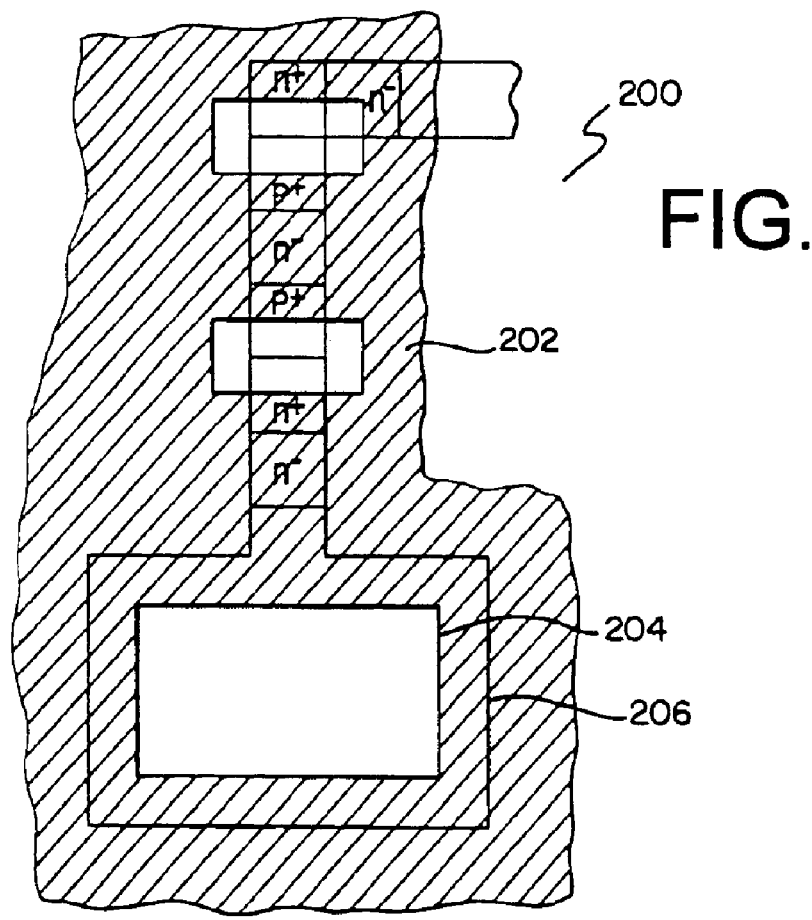
FIG. 6(f) illustrates another processing step for fabricating the voltage up-converter illustrated in FIG. 4.
Figure 6G:
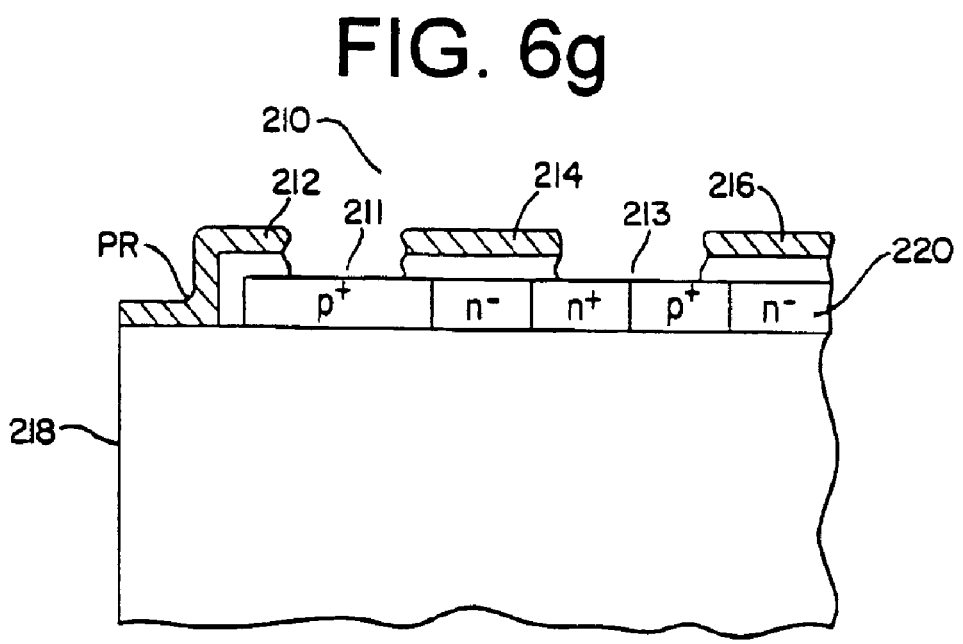
FIG. 6(g) illustrates a cross sectional view of the voltage up-converter illustrated in FIG. 6(f)

A next process step includes photo-masking the substrate to form a contact opening. Preferably, at least two contact openings per photodiode module are formed. For example, as illustrated in FIG. 6(f), a photo-resist 202 is provided over a portion of the substrate, excluding the developed areas over region 182 of FIG. 6d and partial regions where p+ and n+ regions meet. The SiO$_2$ layer, in the unprotected regions, is etched using buffered HF (hydrofluoric acid). After photoresist stripping, the device looks like what is illustrated in FIG. 6g. The SiO$_2$ is removed from surface portions 211, 213 overlaying the laterally disposed p+ region 211 and from a region overlapping adjacent n+ and p+ regions 213.

In the next process step 131 (FIG. 5), contact material is deposited along the surface of the fabricated substrate. This deposited contact material is photo-shaped to form a contact region for the voltage input and output. This deposited contact material is also photo-shaped to shunt the p+ and the n+ regions. Preferably, the contact material is aluminum, however, Cr/Au or other similar materials. Good contacts can be formed to the silicon regions and wire bonds may be formed on the contact material. FIG. 6(h) shows a top view of the photodiode device with two metal regions 242, 244 as described above. Wire 264 may then be connected to contact material in FIG. 6(i) by wire bonding, such as to apply an input voltage for up-converting.

Figure 6H:
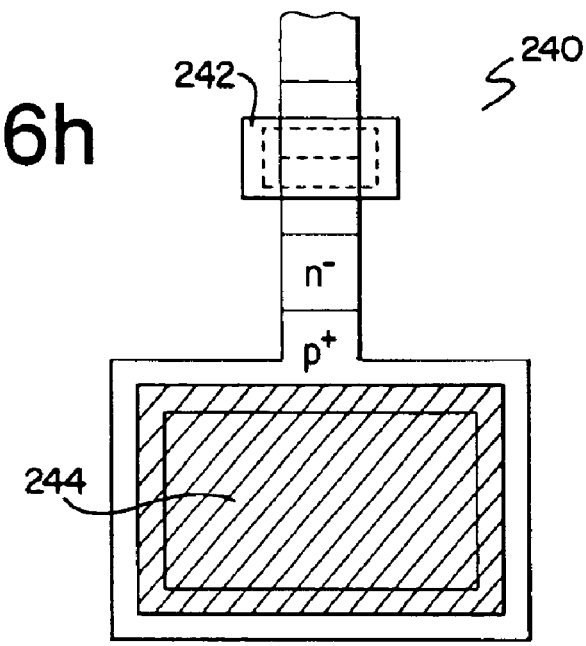
FIG. 6(h) illustrates another processing step for fabricating the voltage up-converter illustrated in FIG. 4.
Figure 6I:
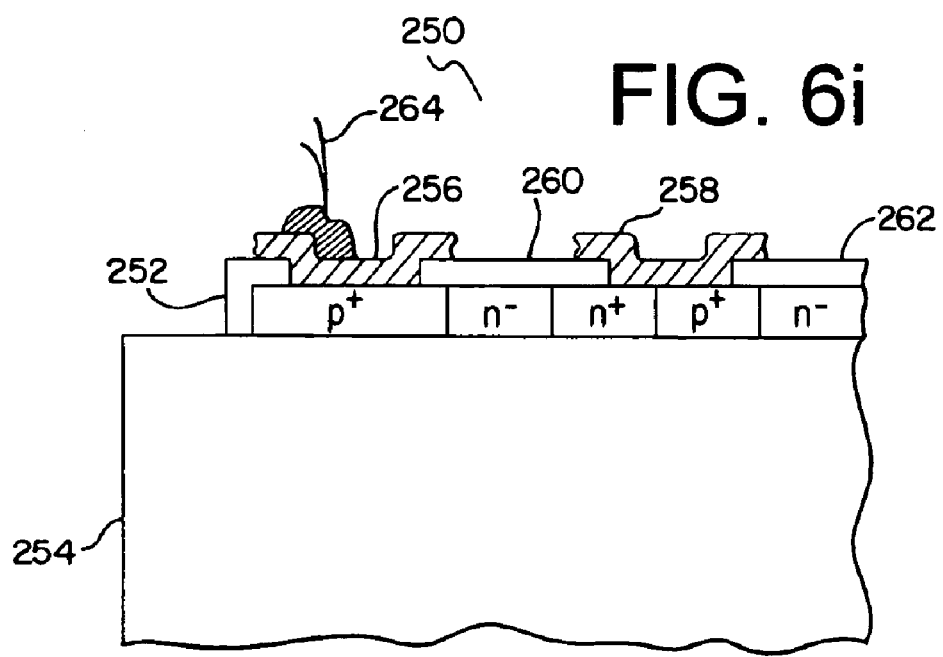
FIG. 6(i) illustrates a cross section of the FIG. 6(h) including an additional processing step.

FIG. 6(i) illustrates the cross section of the device shown in FIG. 6(h) with the inclusion of the wire to 264 to contact material 256.

As a next processing step, the device illustrated in FIG. 6(i) may be encapsulated in an encapsulation media. Encapsulation provides a number of advantageous features. For example, encapsulation protects against moisture, provides the fabricated up-converting module with an enhanced level of rigidity, and also prepares for inclusion into a medical device.

Figure 5:
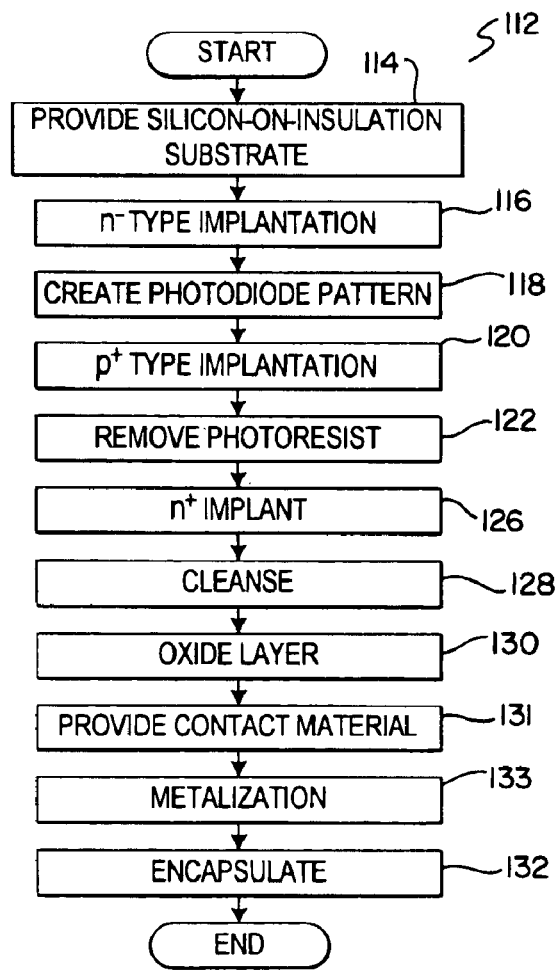
FIG. 5 illustrates a flow chart providing certain processing steps for fabricating an arrangement of the voltage up-converter illustrated in FIG. 4.
Figure 7:
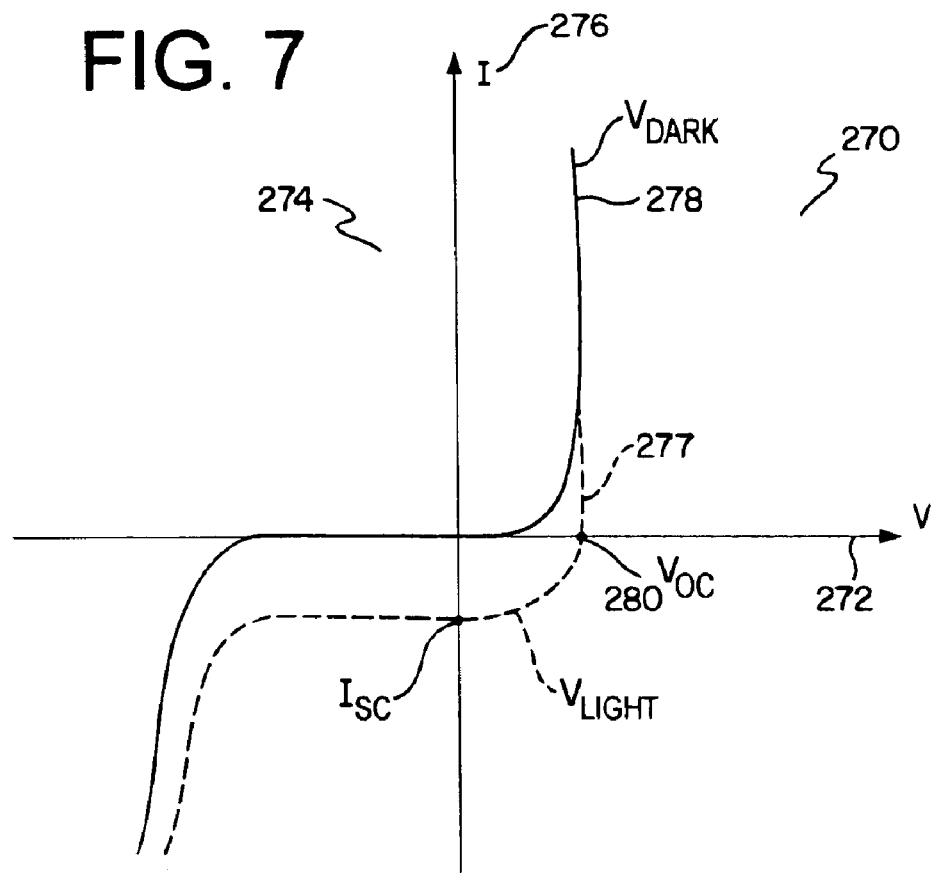
FIG. 7 illustrates a representative voltage (V) versus current (I) graph of one of the photo-diodes included in the voltage up-converter section illustrated in FIG. 6(a)

The process illustrated in FIGS. 5 and 6(a–i) results in a plurality of photodiodes laterally fabricated along a substrate surface. FIG. 7 illustrates a current versus voltage graph 270 that demonstrates how the fabricated photo-diode device utilizes an optical source to provide voltage up-converting. As shown in the graph 270, the line $V_{dark}$ 278 represents the ordinary operating characteristic of a photodiode absent any illumination. In this condition, the voltage versus current characteristics demonstrate that there is no voltage output at zero current.

However, once the photodiode is illuminated, the current versus voltage graph shifts. This shift is graphically represented as $V_{light}$, 277. $V_{light}$ 277 has now shifted along the y-axis so that now, the graph intercept with the x-axis has shifted where this shift is defined as $V_{OC}$ or the photodiode's photo-voltage when no current is drawn (an open circuit condition). Ordinarily, such a diode photo-voltage may be on the order of approximately 0.5 volts. When current is drawn, the open circuit voltage is somewhat lowered.

Figure 8:
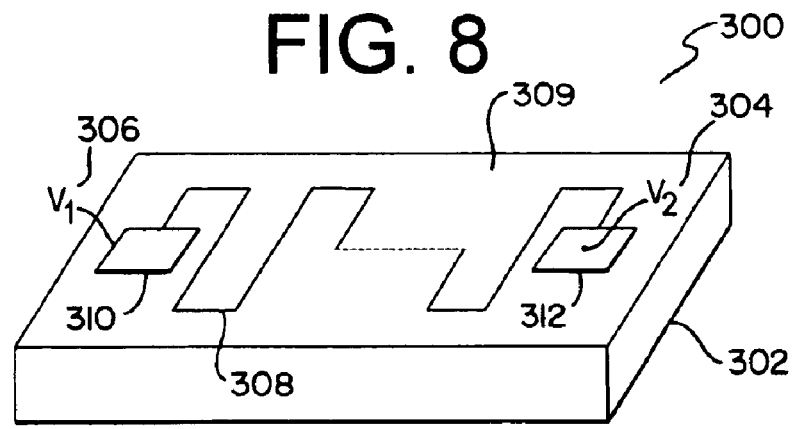
FIG. 8 illustrates a perspective view of the voltage up-converter module illustrated in FIG. 3 fabricated on a sapphire substrate.

FIG. 8 illustrates a perspective view of a fabricated miniaturized up-converter module 300 prior to encapsulation. The miniaturized up-converter device 300 comprises the doped regions arranged in a meandering pattern 309 and provided along a substrate surface 302. A first wire 306 provides an input voltage $V_1$ at a first termination point. A second wire 304 is used to supply a remote device with an up-converted output voltage $V_2$ at the second termination point. This upconverted output voltage $V_2$ may then be supplied to another miniaturized up-converter module, like device 300, or may be used to provide an up-converted voltage to a device such as an X-ray device.

Figure 9:
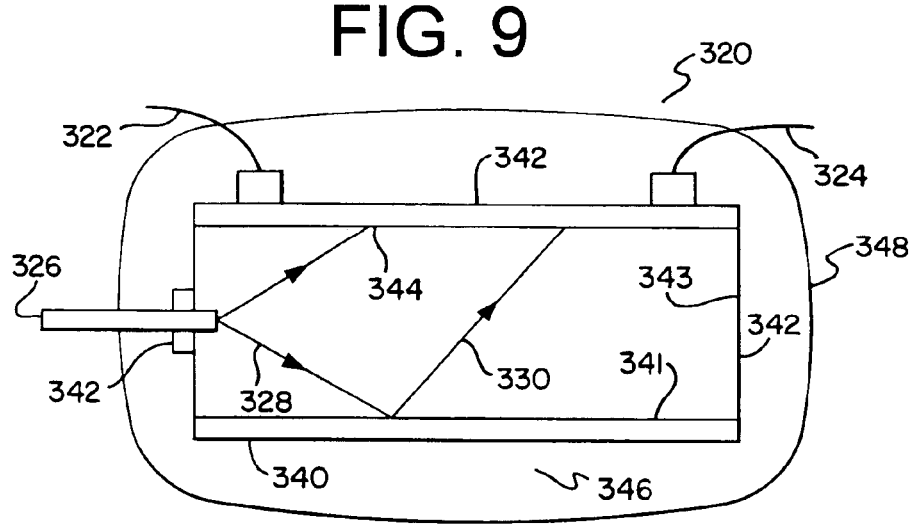
FIG. 9 is a side view of a voltage up-converter illustrated in FIG. 8 coupled to a light source.

FIG. 9 illustrates a photodiode module 320 connected to a fiber. The encapsulated module 320 provides a photodiode device 346 encapsulated within a structure 348. The photodiode device 346 is encapsulated within a structure 348. The photodiode device 346 includes an input wire 322 and an output wire 324, both wires extend beyond the encapsulation structure 348. At one end of the enclosure, a fiber optic light source 326 is provided for providing a source of photons 328. These photons are incident along the plurality of photodiodes residing along a bottom surface 344 of the up-converting module 346. As the photons propagate along the length of the module 346, from the fiber optic cable 326 to a back end 342. Some of the photons reflect off the module bottom surface 344 and off of a bottom enclosure portion 341. The fiber optic cable 326 is fixedly attached to the module via glue 342 or some other adhesive.

A reflective surface 340 may be provided along the top surface of this portion so as to increase an overall reflectivity along the bottom portion 341. A structure back end 342 may also be provided with a reflecting medium 343. The reflective medium may be chosen to have an index of reflection so as to enable the photons reflecting off of this back surface to be totally internally reflected.

Figure 10A:
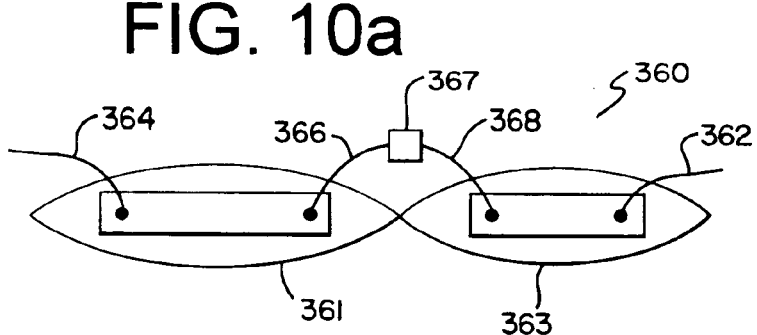
FIG. 10(a) illustrates a preferred arrangement of an encapsulated voltage-up-converter module.

In one arrangement, the up-converting module, such as the module illustrated in FIG. 9, may be encapsulated. For example, two types of module encapsulation arrangements are illustrated FIGS. 10a and b. FIG. 10a illustrates one encapsulation arrangement wherein each separate module is independently encapsulated. In FIG. 10a, a first encapsulated module 361 is provided with an input wire 364 and an output wire 366. The output wire 366 is electrically coupled to an input wire of a second encapsulated module 363. The second encapsulated model 363 also includes an output wire 362 that may be electrically coupled to another encapsulated module. Alternatively, output wire 362 may be electrically coupled to a device requiring a peak up-converted voltage, such as an X-ray device.

Figure 10B:
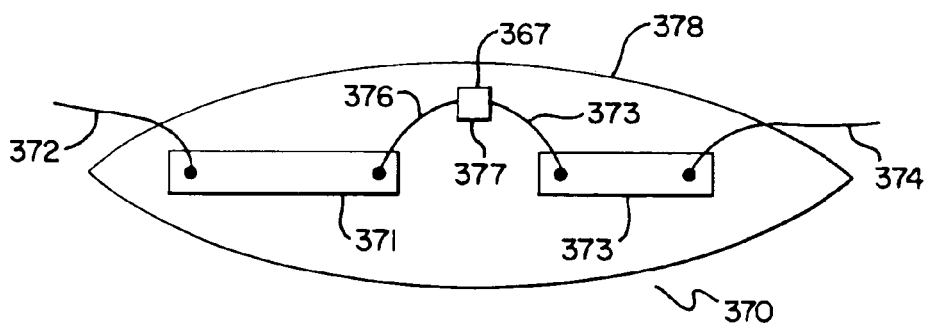
FIG. 10(b) illustrates another preferred arrangement of an encapsulated voltage-up-converter module.

FIG. 10b illustrates an alternative encapsulation arrangement. FIG. 10b illustrates an encapsulation arrangement wherein two up-converting modules are encapsulated within a single encapsulation structure 378. In FIG. 10b, a first module 371 has an input wire 372 and an output wire 376. The output wire 376 is coupled to an input wire of a second module 373. The second model 373 includes an output wire 374 that may be coupled to another encapsulated module or other device requiring an up-converted voltage, such as an X-ray device.

Exemplary embodiments of the present invention have been described. Those skilled in the art will understand, however, that changes and modifications may be made to these embodiments without departing from the true scope and spirit of the present invention, which is defined by the claims.

I claim:

1. An apparatus for up-converting an initial voltage, said apparatus comprising:
    a first photodiode module receiving said initial voltage;
    a first photon source optically coupling said first photodiode module to a light source wherein said first module up-converts said initial voltage to a first up-converted voltage;
    a second photodiode module receiving said first up-converted voltage from said first photodiode module; and
    a second photon source coupling said second photodiode module to said light source;
    wherein said second photodiode module up-converts said first up-converted voltage to a second up-converted voltage.

2. The apparatus of claim 1 wherein said first photodiode module comprises a plurality of laterally fabricated photodiodes.

3. The apparatus of claim 1 wherein said first photodiode module receives said initial input voltage from a voltage source.

4. The apparatus of claim 1 wherein said initial voltage is essentially greater than zero.

5. The apparatus of claim 1 wherein a third photodiode module up-converts said second up-converted voltage.

6. The apparatus of claim 1 wherein said first photodiode module is encapsulated in an encapsulation media.

7. The apparatus of claim 1 wherein said first photodiode module and said second photodiode module are encapsulated in an encapsulation media.

8. The apparatus of claim 1 wherein said first module has a first up-converting rate and said second module has a second up-converting rate.

9. The apparatus of claim 8 wherein said first up-converting rate is substantially equivalent to said second up-converting rate.

10. The apparatus of claim 1 wherein said second up-converted voltage is applied to a miniaturized X-ray device, said up-converter voltage sufficient to enable said X-ray device to irradiate X-rays at a desired location.

11. A method of voltage up-converting comprising the steps of:
    electrically coupling a first up-converting module to a second up-converting module;
    optically coupling a photon source to said first and said second up-converting modules;
    utilizing said photon source to generate at said first up-converting module a first up-converted voltage;
    providing said first up-converted voltage to said second up-converting module from said first up-converting module; and
    utilizing said photon source to up-convert said first up-converted voltage at said second up-converting module.

12. The method of claim 11 further comprising the step of providing an input voltage from a voltage source to said first up-converting module; and up-converting said input voltage to said first up-converted voltage.

13. The method of claim 11 further comprising the step of providing a third up-converting module, said third up-converting module utilizing a third up-converting rate to up-convert said second up-converted voltage to a third up-converting voltage.

14. The method of claim 11 further comprising the step of encapsulating said first up-converting module in an encapsulating media.

15. The method of claim 11 further comprising the step of encapsulating said first and said second up-converting module in an encapsulating media.

16. A miniaturized, flexible voltage up-converting instrument comprising:
    an X-ray generating source insertable into a body of a patient to a location in close proximity to a desired point of X-ray application; and
    a first modular photodiode voltage up-converter coupled to said X-ray generating source;
    wherein an up-converted voltage is applied to said X-ray source to generate a desired amount of X-ray dose at said desired point of X-ray application.

17. The invention of claim 16 further comprising a second modular photodiode voltage up-converter coupled to an input of said first modular voltage up-converter, said first modular photodiode providing an upconverted voltage to said first modular photodiode voltage up-converter.

18. The invention of claim 16 wherein said apparatus is a medical device.

19. The method of claim 16 wherein said medical device is a catheter.

20. The method of claim 19 wherein said catheter has an outer diameter of approximately 1–3 millimeters.

21. A miniaturized, flexible voltage up-converting instrument comprising:
- an X-ray generating source insertable into a body of a patient to a location in close proximity to a desired point of X-ray application; and
- a first modular voltage up-converter coupled to said X-ray generating source;
- wherein an up-converted voltage is applied to said X-ray source to generate a desired amount of X-ray dose at said desired point of X-ray application.

22. The invention of claim 21 further comprising a second modular voltage up-converter coupled to an input of said first modular voltage up-converter, said second modular voltage up-converter providing an upconverted voltage to said first modular voltage up-converter.

23. The invention of claim 22 wherein said second modular photodiode voltage up-converter is flexibly coupled to an input of said first modular voltage up-converter.

24. The invention of claim 21 wherein said apparatus is a medical device.

25. The method of claim 21 wherein said medical device is a catheter.

26. The method of claim 25 wherein said catheter has an outer diameter of approximately 1–3 millimeters.

* * * * *